United States Patent [19]

Bright et al.

[11] Patent Number: 4,544,841

[45] Date of Patent: Oct. 1, 1985

[54] DETECTOR DEVICE FOR A CONVEYOR

[75] Inventors: David E. Bright, Sevenoaks; Steven K. Jones, Billericay, both of England

[73] Assignee: Post Office, London, England

[21] Appl. No.: 477,403

[22] Filed: Mar. 21, 1983

[30] Foreign Application Priority Data

Mar. 19, 1982 [GB] United Kingdom ............... 8208175

[51] Int. Cl.⁴ .............................................. G01V 9/04
[52] U.S. Cl. .................................. 250/221; 250/222.1
[58] Field of Search ................ 250/222.1, 222.2, 221, 250/223; 377/53; 350/299, 303, 304, 305; 340/555, 556, 557

[56] References Cited

U.S. PATENT DOCUMENTS

| | | |
|---|---|---|
| 3,025,406 | 3/1962 | Stewart et al. ..................... 250/221 |
| 3,041,462 | 6/1962 | Ogle ..................................... 250/219 |
| 3,383,517 | 5/1968 | Phillipson et al. ................. 250/221 |
| 3,512,002 | 5/1970 | Decker ................................ 250/222 |
| 3,584,226 | 6/1971 | Lerner ............................... 250/222.1 |
| 4,347,438 | 8/1982 | Spielman ......................... 250/222.2 |

*Primary Examiner*—David C. Nelms
*Assistant Examiner*—James Gatto
*Attorney, Agent, or Firm*—Larson and Taylor

[57] ABSTRACT

A detector device for detecting the passage of articles of a conveyor comprises an energy source element 8, an energy responsive element 10 and reflector means 27, 9 and 28, positioned so that a beam of energy from the source element 8 to the responsive element 10 first traverses the conveyor path substantially parallel and close to the conveyor surface and is then reflected back and forth across the conveyor path in a plane substantially perpendicular to the conveyor surface.

9 Claims, 6 Drawing Figures

DETECTOR DEVICE FOR A CONVEYOR

This invention relates to a detector for detecting the passage of articles on a conveyor and is particularly though not exclusively concerned with the detection of postal parcels on the conveyor of a conveyor sorting machine.

As is known, the conveyors of such sorting machines are operative to discharge articles fed onto the conveyor at predetermined destinations along the length of the conveyor under the control of a central control unit into which, on the loading of each parcel, a code indicative of the destination of that parcel is fed. Furthermore, in the case of sorting machines of the tilting slat kind where the conveyor surface is formed of transverse tiltable slats with each parcel occupying as many slats as its length requires, it is also necessary to include in each parcel code an indication of the length of each parcel, so that on discharge of the parcel the requisite number of slats are tilted (usually sequentially). This may be achieved by operating the one or more coding desks which will be provided at the loading station or stations of the machine in conjunction with a photoelectric or like detector arrangement on the conveyor so that the particular destination code is applied to a memory, register or the like repeatedly whilst the parcel is cutting the beam of the detector.

Such detectors have hitherto consisted of an energy source (e.g. a light source) on one side of the conveyor and an energy responsive element (e.g. a photoelectric cell) on the other side of the conveyor producing a single beam which traverses the conveyor path. However, this single beam type of detector suffers from the disadvantage that with irregularly shaped parcels, the beam may be cut (and re-established) by the same parcel more than once leading to incorrect information being sent to the central control unit of the conveyor thereby resulting in mis-sorting of the parcels.

It is an object of the invention to provide an improved detector which overcomes this disadvantage or at least represents a significant improvement on the known detectors.

According to the invention, a detector for detecting the passage of articles on a conveyor comprises an energy source element, an energy responsive element and reflector means positioned such that a beam of energy from the source element to the responsive element first traverses the conveyor path substantially parallel and close to the conveyor surface and is then reflected back and forth across the conveyor path in a place substantially perpendicular to the conveyor surface.

Preferably the detector consists of two units positioned on opposite sides respectively of the conveyor one of which houses the energy source element, an elongate mirror and the energy responsive element and the other of which houses a first mirror and a second elongate mirror.

The energy source element may comprise a light source and the energy responsive element a photoelectric detector. The energy source element may be mounted in its respective unit for adjustment lengthwise of the conveyor and for tilt angularly to displace the beam in the aforementioned substantially perpendicular plane. The energy responsive element may be mounted in its respective unit for adjustment lengthwise of the conveyor, for tilt angularly to displace the beam in the substantially perpendicular plane and for bodily movement upwards and downwards. The reflector of the first unit may be adjustably mounted for tilt in the plane referred to and for movement lengthwise of the conveyor.

The unit may itself be mounted on a mounting permitting adjustment of the unit relative to the conveyor upwards and downwards and for swivelling movement about an axis substantially perpendicular to the conveyor surface.

The first reflector of the reflector assembly may also be mounted in its unit for adjustment lengthwise of the conveyor and for tilt in the substantially perpendicular plane and so also may the second reflector be so adjustable. As with the first unit, the second unit may be mounted on a mounting permitting adjustment of the unit relative to the conveyor upwards and downwards and for swivelling movement about an axis substantially perpendicular to the conveyor surface.

The second reflector may be provided with a spirit level.

One embodiment of the invention will now be described by way of example with reference to the accompanying drawings in which.

Figure 1:
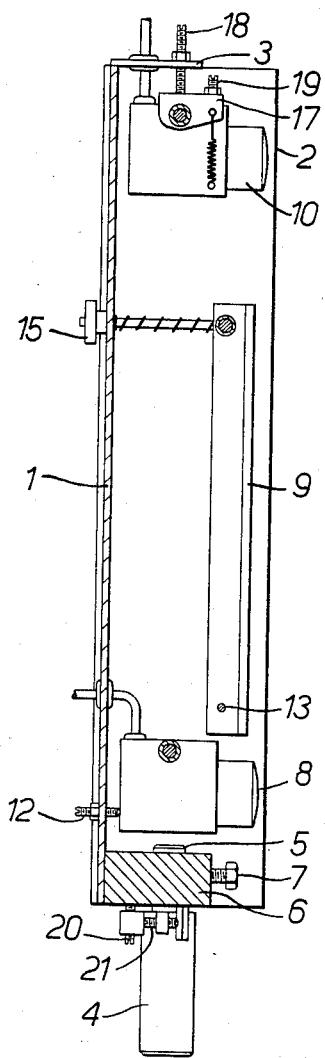
FIG. 1 is a sectional elevation of a first unit of a detector of the invention.
Figure 2:
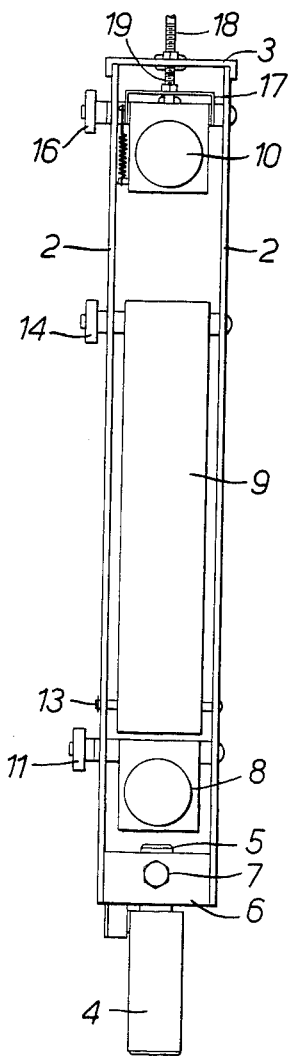
FIG. 2 is a front view of the unit of FIG. 1.
Figure 3:
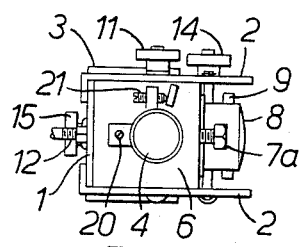
FIG. 3 is an underneath view of the unit.

Referring to FIGS. 1 to 3, the first unit is in the form of an elongate casing comprising a back 1, two side members 2 and a cover 3. The unit is mounted on a mounting comprising a post 4 having a spigot 5 by means of block 6 secured to the back 1 and through which the spigot projects. A securing bolt 7 is provided. The unit houses a light source 8 a reflector 9 and a photoelectric cell 10 and in use the unit is mounted on the conveyor of a conveyor sorting machine in an upright position (in relation to the conveyor which is assumed to be horizontal) and on one side of the conveying path with the source 8, reflector 9 and cell 10 facing across the conveyor. The source 8 is mounted on an adjustment screw 11 enabling the source to be adjusted within the confines of the housing lengthwise of the conveyor and is also provided with a further adjustment screw 12 enabling the source to be tilted about the axis of the screw 11.

The reflector 9 is slidably mounted on a pin 13 and is provided with a first adjustment screw 14 permitting the reflector to be adjusted lengthwise of the conveyor within the confines of the housing and a second adjustment screw 15 permitting tilting adjustment of the reflector in a generally vertical plane.

The cell 10 is mounted in the housing on an adjustment screw 16 through the intermediary of a bracket 17 with adjustment screws 18 and 19 connected between the housing and the bracket and between the bracket and the cell respectively. As will be appreciated, adjustment of the cell 10 lengthwise of the conveyor within the housing is permitted by the screw 16, bodily movement upwards and downwards of the cell is permitted by the screw 18 (the adjustment screw 16 passing through slots in the side members 2 for this purpose) and tilting adjustment in a generally vertical plane is permitted by the screw 19. Furthermore the housing itself is adjustable relative to the mounting 4 firstly bodily upwards and downwards by means of an adjusting screw 20 and secondly angularly about the axis of the spigot 6, by a further adjusting screw 21.

Figure 4:
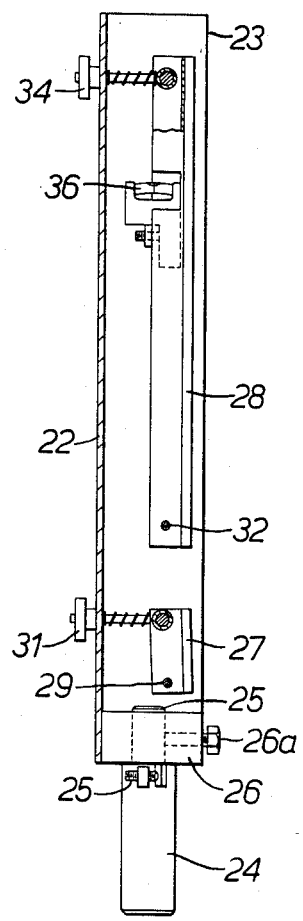
FIG. 4 is a sectional elevation of a second unit of the scanner.
Figure 5:
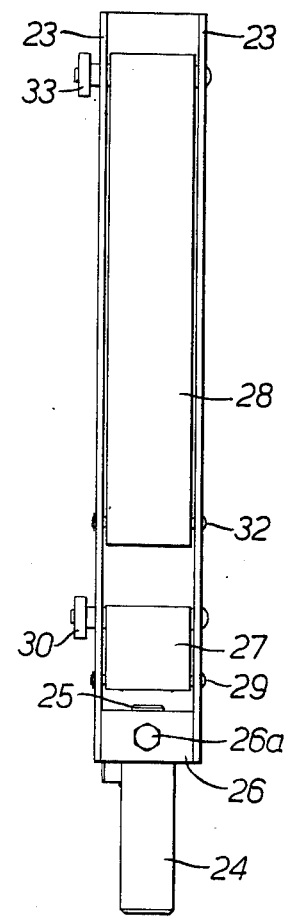
FIG. 5 is a front view of the unit of FIG. 4.
Figure 6:
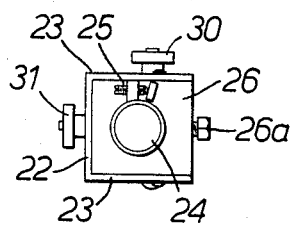
FIG. 6 is an underneath view of the unit.

Referring now to FIGS. 4 to 6, this unit is also in the form of an elongate housing consisting of a back 22 and two side members 23. As with the first unit, the unit is mounted on a mounting consisting of a post 24 having a spigot 25 by means of a block 26 secured to the back 22 and through which the spigot 25 passes, a securing bolt 26a also being provided.

The unit houses a first reflector 27 and a second reflector 28 and again in use of the unit, the housing is mounted so that the first and second reflectors face across the conveyor. The first reflector is slidably mounted on a pin 29 and is provided with a first adjustment screw 30 by means of which the reflector may be adjusted lengthwise of the conveyor within the confines of the housing and a second adjustment screw 31 permitting the reflector to be tilted in a generally vertical plane. The second reflector 28 is likewise mounted on a pin 32 for limited sliding movement lengthwise of the conveyor and provided with a first adjustment screw 33 and a second tilt adjusting screw 36. The housing itself may be swivelled slightly about the axis of the spigot 25 by means of a setting screw 35. Lastly the reflector 28 incorporates a spirit level 36.

In operation of the detector, the light source, cell and mirrors are set up using the various adjustment means if necessary so that the beam from the source 8 first traverses the path of the conveyor substantially parallel and close to the conveyor surface to be reflected by the reflector 27 and to the reflector 9 and from there to the reflector 28 and then between the reflectors 9 and 28, i.e., back and forth across the conveyor path, in a plane generally perpendicular to the surface of the conveyor to the cell 10. The reflections after the initial reflection are at greater angles of incidence than the initial reflection.

It will thus be seen that the above described detector significantly improves upon the known single beam scanners in that a much more reliable detection of articles of irregular shape is provided.

The angles of incidence of the beam after reflection from the reflector 27 requires consideration in that from the point of view of reliability of detection, these angles should be as low as possible. However if the path of the beam from the source 8 to the cell 10 is too long then a very powerful source and/or very sensitive detector will be required. Therefore a compromise must be made having regard to these conflicting requirements.

We claim:
1. A detector device for detecting the passage of articles on a conveyor, said detector device comprising an energy source element, an energy responsive element and reflector means positioned relative to said energy source element and said energy responsive element such that a beam of energy transmitted between the source element and the responsive element first traverses the conveyor path substantially parallel to and adjacent to the conveyor surface and is then reflected back and forth across the conveyor path in a plane substantially perpendicular to the conveyor surface such that the reflections of the beam after the initial reflection are at greater angles of incidence than the initial reflection.

2. A detector device as set forth in claim 1 and consisting of two units positioned on opposite sides respectively of the conveyor one of which houses the energy source element, an elongate mirror and the energy responsive element and the other of which houses a first mirror and a second elongate mirror.

3. A detector device as set forth in claim 1, in which the energy source element comprises a light source and the energy responsive element a photoelectric detector.

4. A detector device as set forth in claim 2, in which the energy source element is mounted in its respective unit for adjustment lengthwise of the conveyor and for tilt angularly to displace the beam in said plane.

5. A detector device as set forth in claim 2, in which the energy responsive element is mounted in its respective unit for adjustment lengthwise of the conveyor, for tilt angularly to displace the beam in said plane and for bodily movement upwards and downwards.

6. A detector device as set forth in claim 2, in which the reflector of said one unit is adjustably mounted for tilt in the said plane and for movement lengthwise of the conveyor.

7. A detector device as set forth in claim 2, in which the first reflector of said other unit is mounted for adjustment lengthwise of the conveyor and for tilt in said perpendicular plane.

8. A detector device as set forth in claim 2 in which the second reflector of said other unit is mounted for adjustment lengthwise of the conveyor and for tilt is said perpendicular plane.

9. A detector device as set forth in claim 2, in which said units are each mounted on a mounting permitting adjustment of the unit relative to the conveyor upwards and downwards and for swivelling movement about an axis substantially perpendicular to the conveyor surface.

* * * * *